3,222,129
METHOD FOR PRODUCING ACTIVE ALUMINA NODULES

Harry E. Osment and Robert B. Emerson, Baton Rouge, La., assignors to Kaiser Aluminum & Chemical Corporation, Oakland, Calif., a corporation of Delaware
No Drawing. Filed Feb. 26, 1962, Ser. No. 175,835
2 Claims. (Cl. 23—141)

This invention relates to the preparation of an active alumina material. More particularly, it relates to an improved method of making active alumina nodules from alumina hydrate such as is obtained by precipitation from sodium aluminate in the well-known Bayer process. The invention also relates to the active alumina product which has improved resistance to attrition, abrasion and crushing. Active alumina material made according to the invention is particularly suitable for use as adsorbents, catalysts and catalyst support materials.

Active alumina may be used as an adsorbent or dehydrating agent, e.g., a desiccant, as a catalyst or as a component of a catalyst, such as a base or support upon which is deposited or within which is incorporated various materials.

Active aluminas which are widely used in various branches of the chemical industry, for example, the petroleum industry, are crystalline or amorphous in structure and are prepared by various different methods. There are substantial variations in the technical and chemical properties of the many different forms of active alumina, and it is recognized by those skilled in the art that these differences are imparted to the material during the several stages of the manufacture thereof. However, the present knowledge of producing active alumina has been gained generally by empirical observation and has not yet progressed to the point where one can predict with a reasonable degree of reliability what properties can be expected by a particular change or variation in any of the manufacturing steps.

Active alumina may be manufactured in shaped nodules or pellets, etc., in the forms of spheres, or the like, preferably of uniform size and shape. The shaped nodules of active alumina are particularly desirable because they can be more easily handled than granular or particulate material.

Many applications of the use of active alumina require the active alumina material to have high physical strength, resistance to attrition, abrasion or crushing in order that the particles can be disposed in beds of appreciable height without crushing of the bottom particles and without undue losses due to attrition. This is the case, for example, where the active alumina is to be used for catalysts or adsorbents. In addition to these physical strength characteristics, the particles must also have high catalytic activity and adsorptive capacity.

This invention provides a method for obtaining an improved active alumina material of substantially uniform size and in the form of substantially spherical nodules having a high resistance to attrition, abrasion and crushing without sacrificing other necessary qualities such as sorptive capacity, adsorption surface area, and purity. The improved product of the invention is suitable for various uses, e.g., as adsorbents in columns or beds for drying of gases or vapors, as a catalyst per se or as a component of a catalyst.

According to one conventional method for producing nodules of active alumina, a bed of alumina hydrate particles is first partially calcined in a suitable furnace, such as a kiln, and then the partially calcined particles are ground to the desired particle size. The ground particles are subsequently mixed with water to nodulize and agglomerate the particulate material. The nodules so produced are cured by heating at low temperature and the cured nodules are then heat treated to achieve the desired degree of activity. As an example of this method of producing active alumina, finely divided crystalline particles of alumina trihydrate of small particle size, on the order of less than a hundred microns, are heated to temperatures not exceeding 500° C. to alter the structure of the alumina trihydrate, during which alteration water is formed and is liberated as water vapor. The partially dehydrated material is then ground so that the particles are extremely small, e.g., on the order of one to two microns. The ground particles are mixed with water to form agglomerated nodules and heated to low temperatures, e.g., about 100° C., for a period of several hours to cure the nodules. The cured material is activated by heating to a temperature in excess of 700° F. for a period of time.

Among other methods which have been proposed is a method wherein in the calcination step the alumina trihydrate particles are brought into contact with streams of hot gas. The heated gas partially dehydrates the alumina hydrate particles and continuously withdraws the water vapor from contact with the calcined product. Such a calcination technique may be performed in a long tube furnace wherein the alumina hydrate particles travel for a short time with a cocurrent flow of hot gases.

According to the instant invention it has been discovered that a superior active alumina product and a more expeditious method of producing active alumina is provided by calcining the alumina hydrate particles in a particular and novel manner.

The present invention involves the formation of a fuel-air mixture which is made to completely surround the alumina hydrate particles. The alumina hydrate particles surrounded with the fuel-air mixture are passed through a combustion zone, such as a flame of sufficient magnitude, temperature and duration to ensure that each of the particles is partially calcined. After each particle is calcined it is rapidly quenched to a temperature on the order of one fourth to one sixth the calcining temperature. It has been found to be particularly beneficial to use very high flame temperatures on the order of 3000 to 3500° F. followed by a rapid quench. After calcining according to the present invention, the partially dehydrated product is subjected to grinding and nodulizing in the usual fashion. During calcining the alumina hydrate particles are intimately mixed with the fuel-air mixture and are then forced to pass through the combustion zone. The decomposition of the trihydrate is highly endothermic and results in instantaneous heat consumption (cooling). Consequently, it is essential that an adequate and constant supply of heat be maintained for each alumina hydrate particle in order to obtain improved calcination.

After calcination, rapid cooling (quenching) is necessary to minimize further thermal transformation to better organize crystalline forms of alumina which have undesirably low surface areas and decreased absorption capacity.

The calcination according to the invention is accomplished by thrusting alumina hydrate particles directly into a combustion zone which may be a sustained, fuel-fired flame. In this manner the alumina hydrate particles are completely surrounded by fuel-air mixture and are maintained within the combustion zone, i.e., flame, for a period of time to ensure the partial calcination of each of the particles. The feeding or thrusting of the alumina hydrate particles may be performed continuously or in small increments into a flame. The flame is preferably maintained at a temperature in the range of 3000° to 3500° F. The calcination results in a transition alumina product which, after processing into nodular form, has superior high strength characteristics. The high strength is obtained without sacrificing the catalytic activity or absorptive capacity of the nodules. Immediately after calcination, that is, upon passage of the particles through the flame, the partially calcined alumina material is rapidly quenched to a temperature of 500° to 750° F. The partially calcined alumina produced is then further cooled and ground to a fine particle size, e.g., about 80% minus 325 mesh. After grinding, the particles are nodulized by mixing with water to agglomerate. The nodulizing is followed by a curing step wherein the nodules are aged for sufficient period of time to allow rehydration to take place. In rehydration the water in the nodules is chemically bound or chemically fixed, the water losing its identity as water, and becoming a part of the crystal of alumina. The cured nodules are then subjected to a heat treatment to activate the nodules. The heat treatment of the nodules to activate them is accomplished by heating the cured material to a temperature in excess of 650° F. for a period of time to achieve the desired degree of activation, e.g., 750° F. for about one hour.

The calcination may be accomplished in any suitable apparatus, for example, a furnace comprised of a relatively short, refractory-lined tube or pipe with a suitable natural gas or propane burner at one end thereof and a suitable feed mechanism wherein the feed particles are fed into the fuel-air mixture and are carried into the combustion zone in a manner that all of the particles pass through the flame wherein they are drastically heated while in suspension. The resultant mixture of calcined particles, flame and products of combustion are discharged through the combustion zone into a zone where the mixture is very rapidly quenched by admixture of cold gas, such as ambient air. The mixture then enters a zone where the particles can drop out by gravity and the gases can be discharged and, if desired, cleaned in a suitable cleaning apparatus.

For the practice of the invention, any alumina hydrate can be used as the feed material. However, Bayer process alumina trihydrate (essentially gibbsite with impurities which are typical of the Bayer process) is particularly suitable to the process. The present invention allows the calcination of relatively coarse particles (for example, feed material having approximately 90% of the particles plus 200 mesh) as well as fine particles (for example, feed material having approximately 90% of the particles plus 325 mesh).

The calcined alumina product from the flame calciner is nodulized in any suitable type of nodulizer. A particularly suitable nodulizer comprises a pan about 3 feet in diameter and about 18 inches deep. The pan is rotated at a predetermined speed and tilted at about 20 to 45° to the horizontal. Water is added to the calcined alumina for the nodulizing operation. The water, usually in amounts of about 50% per weight of the alumina, is added to the ground alumina as a spray in the nodulizer or the alumina and water may be pre-mixed prior to addition to the nodulizer. The sizes of the nodules will depend upon the nodulizing conditions, such as the residence time in the nodulizer, the speed of pan rotation, rate of feed, etc.

*Table 1*

|  | Improved Product | Product A | Product B | Product C | Product D |
|---|---|---|---|---|---|
| Mechanical Strength: |  |  |  |  |  |
| Attrition Loss, Percent [1] | <2 | 85 | 12 | 100 | 73 |
| Crushing Strength, Percent [2] | 98 | 66 | 87 | 55 | 60 |
| Abrasion Loss, Percent [3] | 0.8 | 1.5 | 1.2 | 3 | 0.2 |
| Other Physical Properties: |  |  |  |  |  |
| Static Sorption at 60% R.H.— Percent [4] | 21 | 20 | 17 | 17 | 17 |
| Adsorption Surface, m.²/g | 365 | 360 | 350 | 210 | 350 |
| True Density, g./cc | 3.1 | 3.3 | 3.2 | 3.3 | 3.2 |
| Pore Volume, cc./g | 0.43 | 0.57 | 0.45 | 0.36 | 0.35 |
| Pore Diameter, Å | 48 | 64 | 51 | 63 | 50 |

[1] Attrition Loss—An activated sample of nodules is screened to obtain 30.0 grams in an appropriate size range, e.g., minus ¼″ plus 8 mesh, minus 6 mesh plus 8 mesh, or minus 8 mesh plus 14 mesh. The sample is then transferred to a 1,000 ml. standard Erlenmeyer flask which has a 1″ diameter hole in the bottom thereof, said hole being covered with a screen of an appropriate mesh size (dependent upon size range of sample—10 mesh screen for minus ¼″ plus 8 mesh sample, 14 mesh screen for minus 6 plus 8 mesh sample, and 18 mesh screen for minus 8 plus 14 mesh sample). A rubber stopper is inserted in the top opening of the flask, which stopper is penetrated with a metal ai inlet nozzle with an inside diameter of 0.19″. The flask is then inverted, fixed in this position, and connected to an air supply system. This system consists of an air pressure regulating system, downstream from a chamber containing a drying agent, and a rotameter, calibrated to pass 6.1 SCFM dry air.

Air is admitted to the test apparatus for a period of time, e.g., 30 minutes or 15 minutes depending on the size of the material being tested. When testing 6 x 8 mesh and 8 x 14 mesh material, it is necessary to provide a small upward flow of 10 to 15% from the test equipment, when putting the flask on or taking it off the test stand; otherwise, some fines may be lost from the stopper outlet while the flask is in the inverted position.

Following the test, the material is screened on a screen of appropriate mesh size (10 mesh screen for ¼ inch x 8 mesh sample, 14 mesh screen for 6 x 8 mesh sample or 18 mesh screen for 8 x 14 mesh sample). The amount remaining on the screen is then weighed to the nearest 0.1 gram. The attrition loss is expressed as follows:

$$\text{Attrition loss, percent} = \frac{(30.0 - \text{final wt.})}{30.0} \times 100$$

(mesh sizes are U.S. standard screen sizes)

[2] Crushing Strength—Material in the size range of minus ¼ inch to plus 8 mesh is placed in a standard cylinder and subjected to a pressure of 1,000 p.s.i. The percentage of particles remaining on a number 8 screen, after having been subjected to pressure, is reported as the crushing strength.

[3] Abrasion Loss—A weighed amount of plus 28 mesh material is tapped on a RO-TAP machine for 30 minutes. The percentage of material passing through the 28 mesh screen on tapping is recorded as the abrasion loss.

[4] Static Sorption at 60% Relative Humidity—A weighed sample of the material is placed in a desiccator having suitable means for maintaining the relative humidity at 60% (for example, a reservoir of sulfuric acid which can be agitated). The sample is allowed to remain in the desiccator for a time sufficient for equilibrium to be achieved, e.g., 24 hours. The static sorption is obtained by the following equation:

$$\text{Percent Static Sorption at 60\% R.H.} = \frac{\text{adsorbed moisture weight}}{\text{active sample weight}} \times 100$$

(mesh sizes in above footnotes are U.S. standard screen sizes)

Substantially uniform size nodules can be produced, of for example, in the size range of ¼″ by 8 mesh in diameter.

The formed nodules from the nodulizer are cured by aging to harden them prior to the final step of activation. It is believed that the nodules from the nodulizer contain a transitional form of alumina. The curing step involves a rehydration of a portion of these transition forms of alumina in the nodules to more fully developed crystalline forms. The curing is preferably accomplished by allowing the wet nodules from the nodulizer to remain in sealed storage containers for a suitable period of time, e.g., 24 hours, at a temperature of about 80° C. or higher. However, curing can also be accomplished by using lower temperatures, such as ambient temperature, and longer periods of time.

The cured nodules are activated in the final step of the process in a moving bed column by the passage of air at a high temperature, e.g., 750° F. for about 1 hour, through the bed to obtain the desired product.

The product from this process has high mechanical strength without sacrificing purity or other physical properties desirable in active alumina for use as an adsorbent, catalyst, or catalyst support. Its improved strength and other qualities are shown in Table I which compares typical data for this improved active alumina with other active alumina products.

The mechanical strength characteristics shown by the improved product in Table I are advantageous in any commercial process utilizing a solid adsorbent or a catalyst. These high mechanical strength characteristics of the improved active alumina material of the invention result in (1) less dust loss thereby reducing or substantially eliminating pluggage of equipment or contamination of the material being processed, (2) longer life of the active alumina or catalyst supported by the alumina, and (3) longer on-stream cycles and fewer replacements of the active alumina material thereby resulting in an improved over-all efficiency.

It will be understood that various changes, modifications and alterations may be made in the instant invention without departing from the spirit and scope thereof, and, as such, the invention is not to be limited except as by the appended claims wherein what is claimed is:

1. In a method for producing nodules of active alumina by partially calcining alumina hydrate particles to a transition alumina, grinding the partially calcined particles, mixing the ground particles with water to form nodules, curing the resultant nodules and heat treating the same to activate, the improvement in the partial calcining step comprising:
 (a) surrounding the alumina hydrate particles with a fuel-air mixture;
 (b) passing the alumina hydrate particles surrounded with the fuel-air mixture through a combustion zone at a flame temperature in the range of 3000° F. to 3500° F. for a period of time to ensure that each particle is partially calcined;
 (c) quenching the partially calcined product prior to grinding.

2. The improved method according to claim 1 wherein the partially calcined product is quenched to a temperature in the range of 500° F to 750° F.

References Cited by the Examiner

UNITED STATES PATENTS

| | | | |
|---|---|---|---|
| 2,378,155 | 6/1945 | Newsome | 23—143 |
| 2,499,675 | 3/1950 | Owen | 23—142 X |
| 2,635,950 | 4/1953 | Robinson | 23—313 |
| 2,876,068 | 3/1959 | Tertian | 23—142 |
| 2,881,051 | 4/1959 | Pingard | 23—143 |
| 2,915,365 | 12/1959 | Saussol | 23—142 |
| 2,961,296 | 11/1960 | Fenerty | 23—142 |

FOREIGN PATENTS 604,947  7/1948  Great Britain.

MAURICE A. BRINDISI, *Primary Examiner.*